(12) United States Patent
Jia et al.

(10) Patent No.: US 12,061,304 B2
(45) Date of Patent: Aug. 13, 2024

(54) DEVICE FOR MONITORING DEEP-SEA SEDIMENT ENVIRONMENT IN MINING POLYMETALLIC NODULES

(71) Applicant: OCEAN UNIVERSITY OF CHINA, Shandong (CN)

(72) Inventors: Yonggang Jia, Shandong (CN); Zhihan Fan, Shandong (CN); Chunsheng Ji, Shandong (CN); Xiaoshuai Song, Shandong (CN); Hailong Shan, Shandong (CN)

(73) Assignee: OCEAN UNIVERSITY OF CHINA, Shandong (CN)

( * ) Notice: Subject to any disclaimer, the term of this patent is extended or adjusted under 35 U.S.C. 154(b) by 239 days.

(21) Appl. No.: 17/689,928

(22) Filed: Mar. 8, 2022

(65) Prior Publication Data

US 2022/0206182 A1 Jun. 30, 2022

Related U.S. Application Data

(63) Continuation of application No. PCT/CN2021/106477, filed on Jul. 15, 2021.

(30) Foreign Application Priority Data

Sep. 11, 2020 (CN) .......................... 202010951681.5

(51) Int. Cl.
*G01V 11/00* (2006.01)
*E21C 39/00* (2006.01)
(Continued)

(52) U.S. Cl.
CPC ............ *G01V 11/002* (2013.01); *E21C 39/00* (2013.01); *G01V 1/3852* (2013.01); *G01V 3/082* (2013.01);
(Continued)

(58) Field of Classification Search
CPC ........ G01V 11/00; G01V 11/002; G01V 1/38; G01V 1/3852; G01V 3/08; G01V 3/082; G01V 8/02; E21C 39/00; E21C 50/00; B63B 27/10; Y02A 90/30; G01S 15/88; G01C 13/00; G01N 15/06; G01N 15/0656; G01N 15/08; G01N 15/088; G01N 27/27; G01N 15/075

See application file for complete search history.

(56) References Cited

FOREIGN PATENT DOCUMENTS

CN 104570157 A * 4/2015
CN 107328552 A * 11/2017 ........... G01C 13/002
(Continued)

*Primary Examiner* — Son T Le

(57) ABSTRACT

A device for monitoring deep-sea sediment environment in mining polymetallic nodules is provided. The monitoring system includes: acoustic Doppler flow profilers, a self-potential probe, a turbidity meter and an underwater camera. The invention can realize long-term in-situ observation of sediment disturbance, and can realize the mechanical recovery of probe rod-type equipment without large-scale mechanical devices, thereby reducing the overall weight of the recovery equipment and increasing the probability of successful equipment recovery. Compared with the existing long-term in-situ observation equipment on the seabed, it is more environmentally friendly, efficient, energy-saving and reliable.

6 Claims, 3 Drawing Sheets

(51) Int. Cl.
*G01V 1/38* (2006.01)
*G01V 3/08* (2006.01)
*G01V 8/02* (2006.01)
B63B 27/10 (2006.01)
E21C 50/00 (2006.01)

(52) U.S. Cl.
CPC ............... *G01V 8/02* (2013.01); *B63B 27/10* (2013.01); *E21C 50/00* (2013.01)

(56) References Cited

FOREIGN PATENT DOCUMENTS

| | | | | | |
|---|---|---|---|---|---|
| CN | 109795653 | A | * | 5/2019 | |
| CN | 209604820 | U | * | 11/2019 | |
| CN | 111942550 | A | * | 11/2020 | ............. B63B 22/08 |

* cited by examiner

DEVICE FOR MONITORING DEEP-SEA SEDIMENT ENVIRONMENT IN MINING POLYMETALLIC NODULES

CROSS REFERENCE OF RELATED APPLICATION

This is a U.S. National Stage under 35 U.S.C. 371 of the International Application PCT/CN2021/106477, filed Jul. 15, 2021, which claims priority under 35 U.S.C. 119(a-d) to CN 202010951681.5, filed Sep. 11, 2020.

BACKGROUND OF THE PRESENT INVENTION

Field of Invention

The present invention relates to the technical field of long-term in-situ monitoring of sediment disturbance in deep-sea surface mineral mining, and more particularly to a device for monitoring deep-sea sediment environment in mining polymetallic nodules.

Description of Related Arts

With the consumption of terrestrial resources, people gradually turn their attention to the ocean. 70% of the earth is covered by oceans, and 15% of the oceans are covered with polymetallic nodules. Polymetallic nodules are located on the surface of seafloor sediments at depths of more than 4,500 meters. Polymetallic nodules resource is rich in reserves, and is considered to be the deep-sea mineral resources with the most commercial mining value in the future.

There are two main reasons why commercial mining of the polymetallic nodule has not been carried out at present: one is limited mining technology, and the other is limited environmental impact. Regarding the monitoring of the environmental impact of polymetallic nodules mining, in terms of the occurrence state of polymetallic nodules, the monitoring of surface sediment disturbances by mining is undoubtedly very important. However, the current environmental monitoring mostly focuses on the monitoring of the water environment. At present, there are few long-term in-situ monitoring devices for sediments, and the current monitoring devices are not enough to meet the needs of such deep-sea long-term in-situ observations.

SUMMARY OF THE PRESENT INVENTION

An object the problem is that there are few conventional long-term in-situ monitoring devices for sediments, the present invention propose, a new deep-sea polymetallic nodule mining sediment environment monitoring device.

Accordingly, in order to achieve the object mentioned above, the present invention provides technical solutions as follows. A device for monitoring deep-sea sediment environment in mining polymetallic nodules, comprising: a monitoring system, a recovery system and a support system; wherein the monitoring system comprises: acoustic Doppler flow profilers, a spontaneous potential probe, a turbidity meter and an underwater camera; wherein: an amount of the acoustic Doppler flow profilers is two, which are fixed on the left side of the recovery frame by screws, a high-frequency downward measurement of the bottom water velocity, and a low-frequency upward measurement of the upper water velocity, so as to cover all the water velocity within 50 meters above the entire seabed. The self-potential probe is 1.8 meters high and is fixed on the right side of the recovery rack through a hoop. The bottom has a 10-centimeter-high metal bottom cone, and the top has a 20-centimeter-high collection cabin. The top of the collection cabin has a ring and the lower part has a 2-centimeter height. The groove, the middle is the rod body with the electrode spacing of 2 cm, the electrodes are evenly distributed, and the electrode is a solid ring reference electrode (same as the solid ring reference electrode material in the application number 2019108263949); the recovery system It includes a recovery rack, a floating ball, a beacon, an acoustic releaser, and a clockwork, and the support system includes a support rack and a stop disk. The floating balls are fixed on the top of the recovery rack by screws. Each floating ball provides about 25 kg of buoyancy. The specific floating ball quantity can be adjusted appropriately according to the total weight of the equipment. The beacon is fixed on the top of the recovery rack by screws, and the height of the top exceeds the floating ball and is guaranteed not to be blocked by other objects. Two of the acoustic releasers are fixed on the left and right sides of the middle of the recovery rack by screws, and the top of the acoustic releaser should be prevented from being blocked by other objects to ensure smooth communication. The mainspring is made of 316 material and can provide a pulling force of 20-50 kg, and the pulling force can be adjusted according to the length of the mainspring being pulled out.

The monitoring devices in the monitoring system are all fixed on the recovery frame of the recovery system through hoops and screws. The recovery frame is placed on the support frame of the support system and connected by iron chains. The iron chains pass through the bolts on the top of the support frame. The end is secured to the hook of the acoustic release in the recovery system.

The acoustic Doppler current profiler is used to measure the ocean current profile data above the monitoring device, and the self-potential probe is used to measure the concentration of suspended solid particles in the water body below the monitoring device, the position of the seabed interface, sediment porosity and redox potential, the turbidity meter is used to measure the seawater turbidity at a single point to correct the test results of the self-potential probe, and the underwater camera with its own light can record the real situation of solid suspended particles in the water body.

Further, the floating ball is used to provide buoyancy for the recovery system, the beacon is used for the positioning of the device on the sea surface after recovery, the acoustic releaser is used for the release of the chain between the recovery system and the support system, and The release of the buckle at the recovery of the natural potential probe rod, after the said buckle is released, the natural potential probe rod is no longer constrained by other forces, at this time, it is only subjected to the pulling force generated by the spring, and the pulling force generated by the spring passes through The pulley changes direction to provide pulling force for the lifting of the spontaneous potential probe.

Further, the bottom of the support frame is provided with a stop plate, which not only provides a counterweight effect but also slows down the settling of the equipment. A hole (through hole) is dug in the middle of the stop plate to reduce the resistance when the device descends.

Deep sea polymetallic nodule mining surface sediment disturbance long-term in-situ monitoring method, is characterized in that, comprises the following steps:

1) installing the monitoring equipment required by the observation system to the predetermined position and perform the following three steps: 1. Connect the recovery system to the support system through a chain (the chain goes through the bolts on the top of the support frame, and the two ends are fixed on the acoustic release); 2. Tighten the spring until the buckle position is tight, and use the cable to connect the pin to the acoustic release;

2) hoisting the device to the sea bottom by scientific research ship crane, and now probe rod is in tensioned and lifted state, and the cable connecting spontaneous potential probe rod is taken off subsequently during device decoupling, and now probe rod is in self-gravity It penetrates down into the sediment under the action.

3) providing the top of the probe rod with a groove, and the bottom of the recovery device with a buckle, wherein the buckle is tightened by a spring, and when the probe rod falls to the time that the buckle and the groove overlap, the buckle is inserted into the groove and the probe rod is Stop falling and complete the penetration process with a penetration depth of about 50 cm.

4) turning on each equipment of monitoring system at this moment, carrying out monitoring work; wherein after the monitoring work is completed, the deck unit issues a release order to the acoustic releaser. In order to prevent one releaser from failing and unable to complete the release work, there are two acoustic releasers installed in parallel, both of which are fixed in the middle of the recovery rack. At this time, the recovery system is disconnected from the support system, the pin that tightens the mainspring is disconnected, and the tension generated by the mainspring pulls the probe out of the sediment and lifts it to the position with a buckle on the upper part. Fixed; at this time, all observation devices float to the sea surface under the action of buoyancy, and the beacon sends out positioning information to complete the recovery of the devices.

Compared with prior art, advantage and positive effect of the present invention are: deep-sea polymetallic nodule mining surface sediment disturbance long-term in-situ monitoring device and method of the present invention can realize long-term in-situ disturbance of sediment Observation, from the shallow sediment porosity, redox potential, erosion and deposition process 50 cm below the seabed surface, to the water velocity profile above the seabed surface, the concentration of suspended solid particles in the water body, turbidity, and the transport of resuspended particles in the water body, parameters such as shift status. It can realize the mechanical recovery of the probe rod type equipment without the need of large mechanical devices, which reduces the overall weight of the recovery equipment and increases the probability of successful recovery of the equipment. Compared with the existing long-term in-situ observation equipment on the seabed, it is more environmentally friendly, efficient, energy-saving and reliable.

Figure 1:
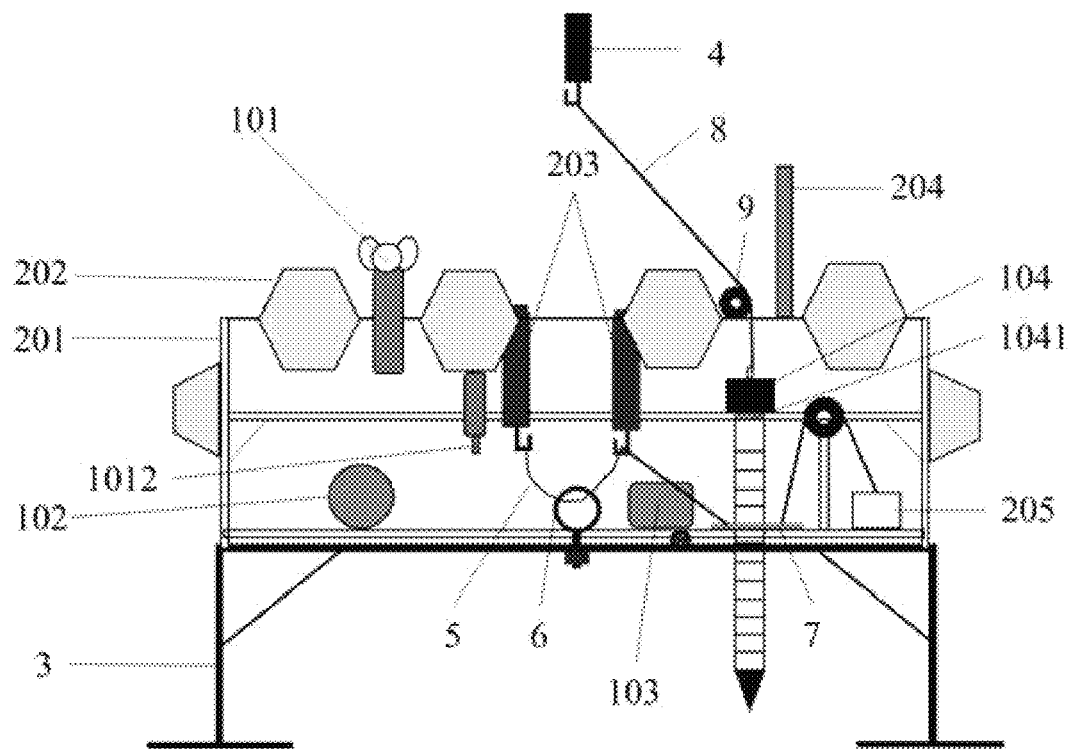
FIG. 1 is an overall schematic diagram before the device of the present invention is deployed.

Reference numbers of elements in the drawings are as follows. 101—upward acoustic Doppler profiler; 1012—downward acoustic doppler profiler; 102—single-point turbidimeter; 103—underwater camera; 104—spontaneous potential probe rod; 1041—probe rod groove; 201—recovery frame; 202—floating ball; 203—acoustic release; 204—beacon; 205—clockwork; 3—support frame; 4—crane hook for a scientific research ship; 5—iron chain; 6—bolt; 7—buckle; 8—cable; 9—pulley; 10—rubber sleeve.

DETAILED DESCRIPTION OF THE PREFERRED EMBODIMENT

In order to be able to understand more clearly the above-mentioned objects, features and advantages of the present invention, the present invention will be further described below in conjunction with specific embodiments. It should be noted that the embodiments of the present application and the features in the embodiments may be combined with each other in the case of no conflict.

In the following description, set forth many specific details in order to fully understand the present invention; however, the present invention can also be implemented in other ways different from those described here; therefore, the present invention is not limited to the specific details of the following disclosure Example limitations.

Embodiment 1

1) Refer to FIG. 1 for the overall schematic diagram of the monitoring device. Install the upward acoustic Doppler flow profiler 101, downward acoustic Doppler flow profiler 1012, turbidity meter 102, underwater camera 103, spontaneous potential probe 104, etc. In the lower position, each device has its own storage function to store all monitoring data in its own SD card, and the data is processed after the device is recovered. In addition, before installation, it is necessary to set conventional parameters for each equipment according to the monitoring requirements. During the installation process, the weight is evenly distributed to keep the center of gravity of the recycling system in the center of the recycling rack. When installing the monitoring equipment, ensure that no other objects above and below block the monitoring effect. There are no special requirements for position sorting. Except for the self-potential probe rod, the other monitoring equipments are fixed and locked with hoop and bolts. The probe rod is limited by a rubber sleeve 10 with a height of 5 cm. The probe rod passes through the sleeve, and the diameter of the sleeve is larger than that of the rod body and less than The diameter of the collection chamber enables the probe rod to move from top to bottom without falling out, and the rubber material has a certain shock absorption effect. The upper part of the rubber sleeve is the buckle 7. When the buckle 7 is opened, the rubber sleeve cannot be moved, and the rubber sleeve is not restricted by the displacement when it is fastened.

2) Install each equipment of the recovery system, and fix the acoustic releaser 203 to the middle of the recovery rack with screws, one on each of the left and right sides, and the release hook is in an open state; the floating ball 202 is screwed to the upper part of the recovery rack And the side wall, pay attention to the normal use of monitoring during the fixing process, and fix the beacon 204 on the top of the recovery rack, the height exceeds the floating ball, and ensure that no other objects block; Finally, fix the clockwork 205 on the top of the recovery rack On the bottom crossbar, the pulley 9 is fixed on the middle crossbar of the recovery rack, and the connecting cable with the probe rod from the clockwork 205 bypasses the pulley 9 and connects to the buckle 7 on the lower crossbar of the recovery rack. The length of the spring can be estimated according to the mechanical properties of the seabed sediments in the expected deployment area and the weight of the probe rod. The larger the pulling distance, the greater the pulling force. The estimated spring tension can be calculated according to the following formula: Estimated spring tension=probe rod Weight+friction resistance of the probe rod inserted into the sediment, where the weight of the probe rod in water is calculated, and the friction resistance of the probe rod inserted into the sediment is obtained by pre-measurement.

Figure 2:
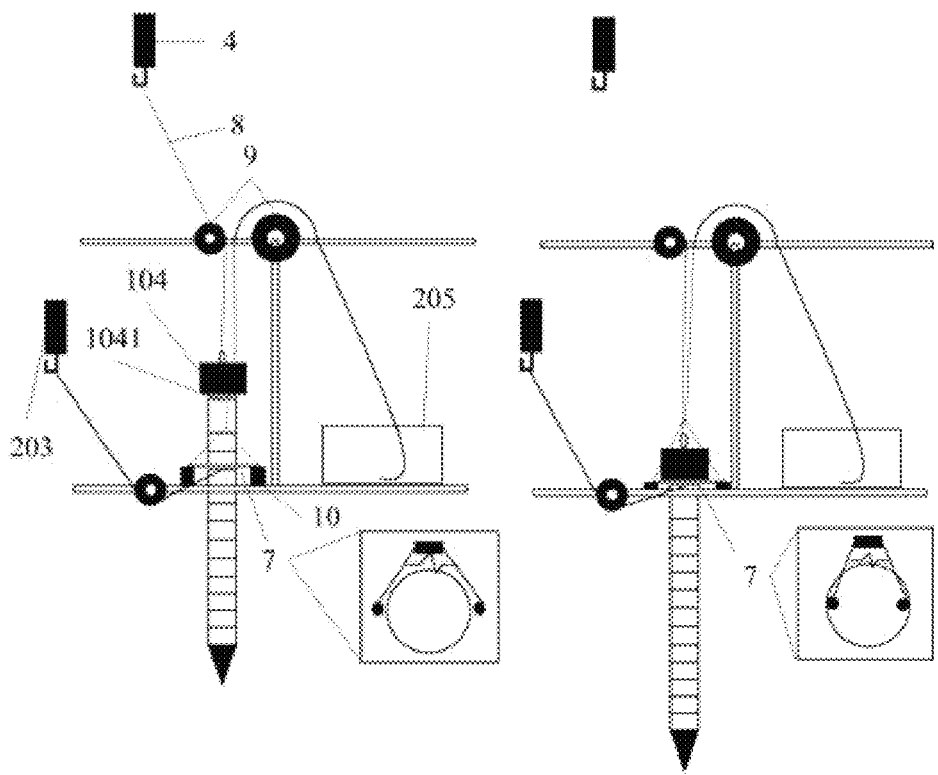
FIG. 2 is a schematic diagram of the spontaneous potential probe penetration when the present invention is deployed on a seabed.
Figure 3:
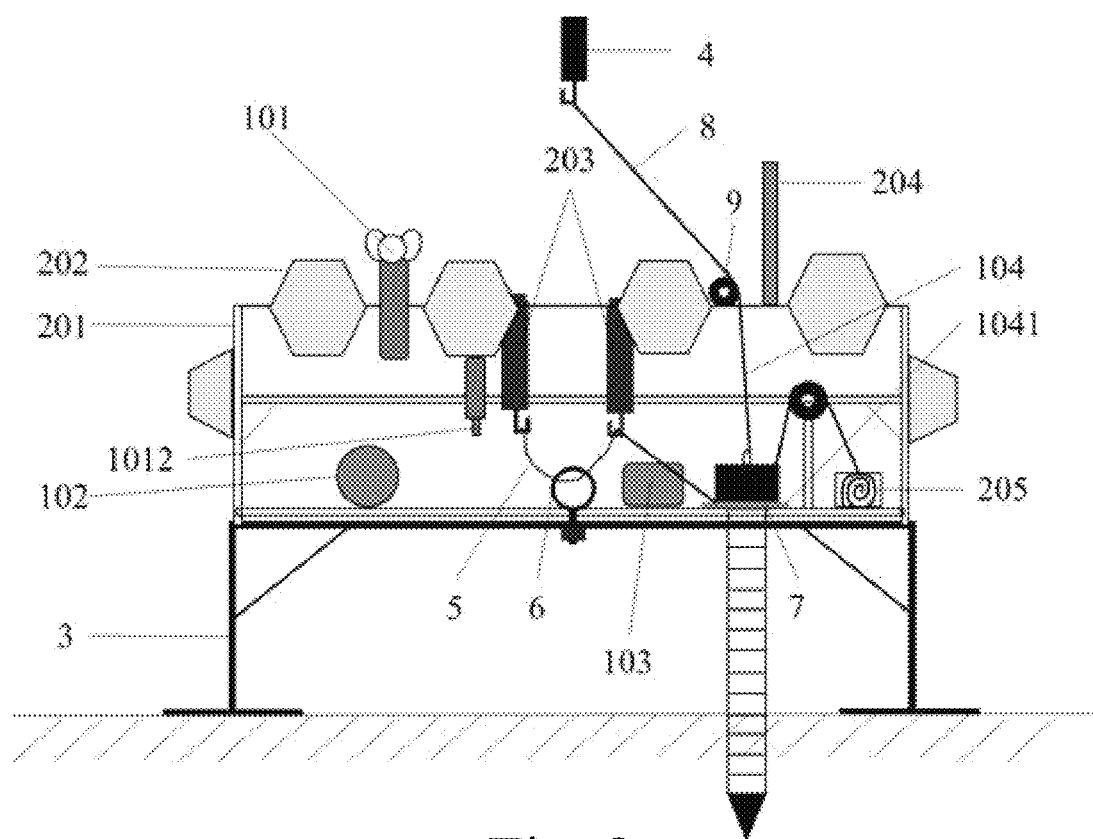
FIG. 3 is a schematic diagram when the device of the present invention is completed and deployed on the seabed.
Figure 4:
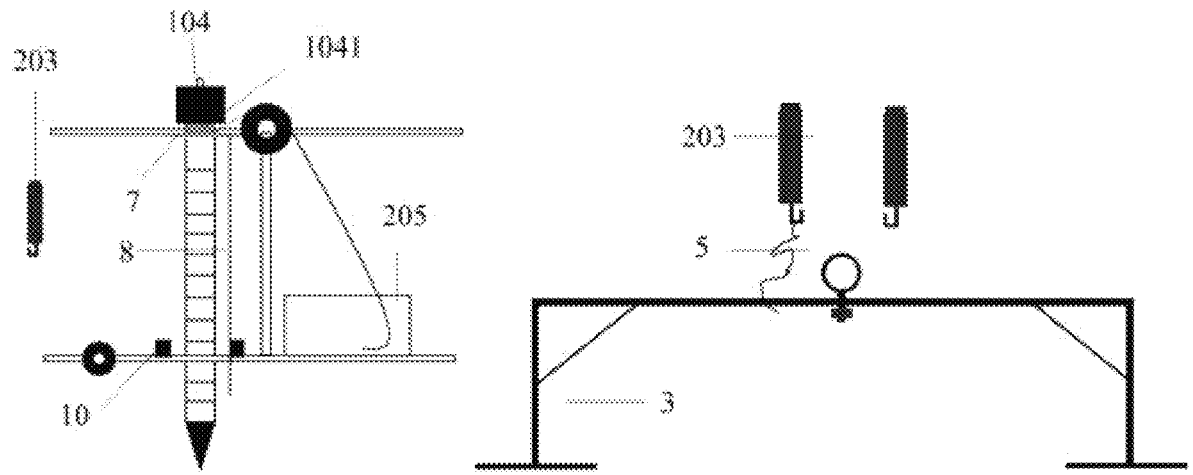
FIG. 4 is a schematic diagram of a probe rod pulling out a recovery system and decoupling when the device is recovered on the seabed.
Figure 5:
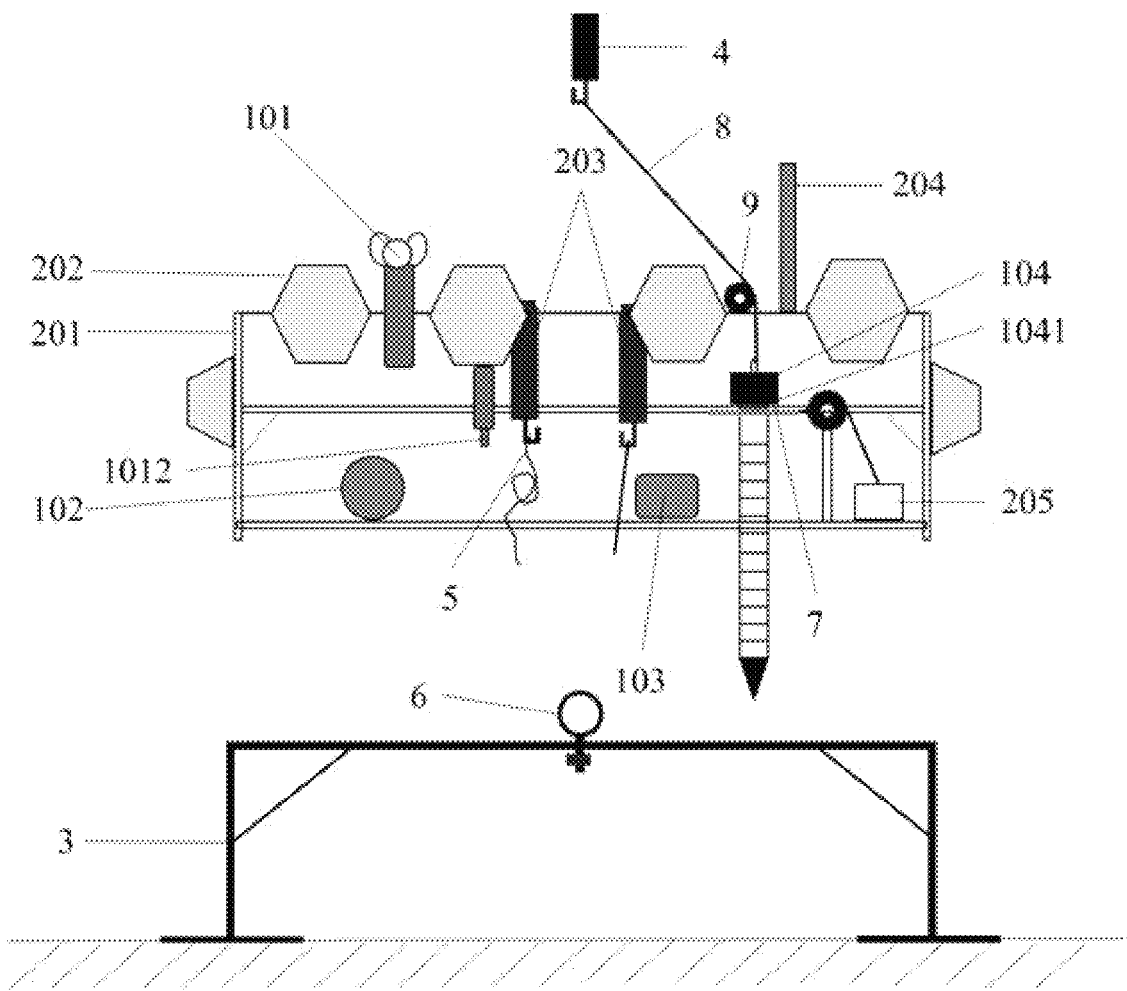
FIG. 5 is a schematic diagram of a monitoring device while floating to the sea surface.

3) The cable connection involved in the fixing process of the equipment mainly includes three aspects: one is to connect the recovery system with the support system through the chain 5, the chain 5 passes through the bolt 6 on the top of the support frame, and the two ends Hook on the acoustic releaser 203 in the recovery rack; at the same time, use a cable to pull the end of the buckle 7 through one end of the pulley, and connect one end to the acoustic releaser 203, and then lock the acoustic releaser to the working standby state, as shown in FIG. 2, when the probe rod penetrates into the sediment and the buckle is in a clamped state, the rubber sleeve will not restrict its displacement, and the buckle is only kept in a tight state under the action of the cable pulling force; finally Use the cable to bypass the pulley 9 and connect one end to the lifting ring on the top of the probe rod, and the other end to the hook 4 of the crane on the scientific research ship. tensioned to complete the connection.

4) The device that is installed and connected is hoisted to the bottom of the sea by the scientific research ship crane, and now the probe rod 104 is in a tensioned lifting state, and the cable 8 connecting the spontaneous potential probe rod is taken off subsequently when the device is decoupling, At this time, the probe rod penetrates down into the sediment under the action of its own gravity, and the double wheels of the buckle 7 limit its position and slow down its downward impulse.

5) A top of probe rod 104 has groove 1041, and the bottom of recovery device is provided with buckle 7, and the buckle is tightened by spring, and when probe rod 104 falls to when buckle 7 and groove 1041 overlap, buckle 7 The probe rod 104 is inserted into the groove 1041 to stop falling, and the penetration process is completed, and the penetration depth is about 50 cm.

6) At the moment, each equipment of monitoring system is opened, carries out monitoring work; After monitoring work is completed, release order is issued to acoustic releaser 203 by deck unit, now the iron chain 5 between recovery system and support system is disconnected, the cable that tightens the buckle 7 is disconnected, and the tension generated by the mainspring 205 directly acts on the probe rod 104 to generate an upward pulling force, which pulls the probe rod out of the sediment and lifts it to the upper part with the clamp The position of the buckle fixes the probe rod 104 again; at this time, all the observation devices float to the sea surface under the action of buoyancy, and the beacon 204 sends out positioning information to complete the recovery of the devices.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A device for monitoring deep-sea sediment environment in mining polymetallic nodules, comprising: a monitoring system, a recovery system and a support system; wherein the monitoring system comprises:
   Doppler flow profilers configured to measure current profile data above the device for monitoring the deep-sea sediment environment in mining the polymetallic nodules;
   a spontaneous potential probe configured to measure a concentration of suspended solid particles in a water body below the device for monitoring the deep-sea sediment environment, a position of a seabed interface, a porosity of sediment and a redox potential;
   a turbidity meter configured to measure a turbidity of seawater at a single point to correct a test result of the spontaneous potential probe; and
   an underwater camera with light configured to record a real situation of the suspended solid particles in the water body;
   wherein the recovery system comprises: a recovery rack and two acoustic releasers;
   wherein the support system comprises a supporting frame; the recovery rack is provided on the supporting frame and connected with the supporting frame by an iron chain; wherein the iron chain passes through a bolt provided on a top of the supporting frame, and two ends of the iron chain are fixed on the acoustic releasers;
   wherein the recovery system further comprises: a float, a spring and a beacon; wherein both the float and the spring are provided on a top portion of the recovery rack; a height of the beacon is higher than the float; the spring is made of 316 stainless steel with a pulling force of 20-50 kg; wherein a first end of the spring is protruding to be connected with the spontaneous potential probe, and the spring is in a tensioning state; a second end of the spring is fixed on a horizontal rod on the recovery rack; the two acoustic releasers are both fixed on a middle part of the recovery rack; an upper part of the spontaneous potential probe is provided with grooves, and a lower part of the recovery frame corresponding to the grooves is provided with spring-tensioned snaps, which connect a cable and is connected to hooks of the acoustic releasers via a pulley.

2. The device for monitoring the deep-sea sediment environment in the mining polymetallic nodules, as recited in claim 1, wherein the support system further comprises a stop plate, wherein the stop plate is a circular disc made of 316 stainless steel, and a through hole is provided in a middle portion of the stop plate.

3. The device for monitoring the deep-sea sediment environment in the mining polymetallic nodules, as recited in claim 1, wherein a bottom of the spontaneous potential probe is provided with a metal bottom cone, a top of the spontaneous potential probe is provided with a collection chamber, and a middle portion of the spontaneous potential probe are provided with plurality of solid ring reference electrodes with intervals of 2 cm.

4. The device for monitoring the deep-sea sediment environment in the mining polymetallic nodules, as recited in claim 3, wherein the solid ring reference electrodes are made of titanium alloy as a skeleton, and graphene with a thickness of 0.1-1 mm is evenly covered on surfaces of the solid ring reference electrodes, after coating, the solid ring reference electrodes are put in an oven at 150° C. for 30 minutes.

5. The device for monitoring the deep-sea sediment environment in the mining polymetallic nodules, as recited in claim 1, an amount of the Doppler flow profilers are two, wherein one of the Doppler flow profilers is high frequency for measuring a velocity of a bottom water body downward, and the other of the Doppler flow profilers is low frequency for measuring a velocity of an upper water body upward.

6. The device for monitoring the deep-sea sediment environment in the mining polymetallic nodules, as recited in claim 1, wherein a rubber sleeve with a diameter in size between a diameter of the spontaneous potential probe and a diameter of the collection chamber is provided on an external of the spontaneous potential probe.

* * * * *